United States Patent [19]

Eckelman

[11] Patent Number: 4,848,568
[45] Date of Patent: Jul. 18, 1989

[54] BATTERY PACKAGE

[76] Inventor: Bruce W. Eckelman, P.O. Box 17425, Portland, Oreg. 97217

[21] Appl. No.: 265,537

[22] Filed: Nov. 1, 1988

[51] Int. Cl.$^4$ .................... B65D 75/02; B65D 71/00
[52] U.S. Cl. .................................................. 206/333
[58] Field of Search ........................................ 206/333

[56] References Cited

U.S. PATENT DOCUMENTS

| | | | |
|---|---|---|---|
| 1,467,577 | 9/1923 | Folsom | 206/333 |
| 1,587,356 | 6/1926 | Riebeth | 206/333 |
| 2,081,656 | 5/1937 | Anthony | 206/333 |
| 2,385,400 | 9/1945 | Briggs | 206/333 |
| 3,661,649 | 5/1972 | Kaye | 206/333 |
| 3,734,279 | 5/1973 | Fisher, Jr. | 206/333 |
| 4,205,121 | 5/1980 | Naitoh | 206/333 |
| 4,696,402 | 9/1987 | Harmon et al. | 206/333 |

FOREIGN PATENT DOCUMENTS 565821  11/1958  Canada ................................ 206/333

*Primary Examiner*—William Price
*Attorney, Agent, or Firm*—Eugene M. Eckelman

[57] ABSTRACT

A container has top, bottom and side walls with open ends. A slot is provided in each of the top and bottom walls and lead in opposite directions from respective ends of the top and bottom walls and terminate short of the respective other ends. The container and its end openings are dimensioned to receive slidably a plurality of batteries with the cathode of some of the batteries projecting through the slot in the top wall and the cathode of others of the batteries projecting through the slot in the bottom wall whereby to distinguish between batteries contained in the holder.

3 Claims, 1 Drawing Sheet

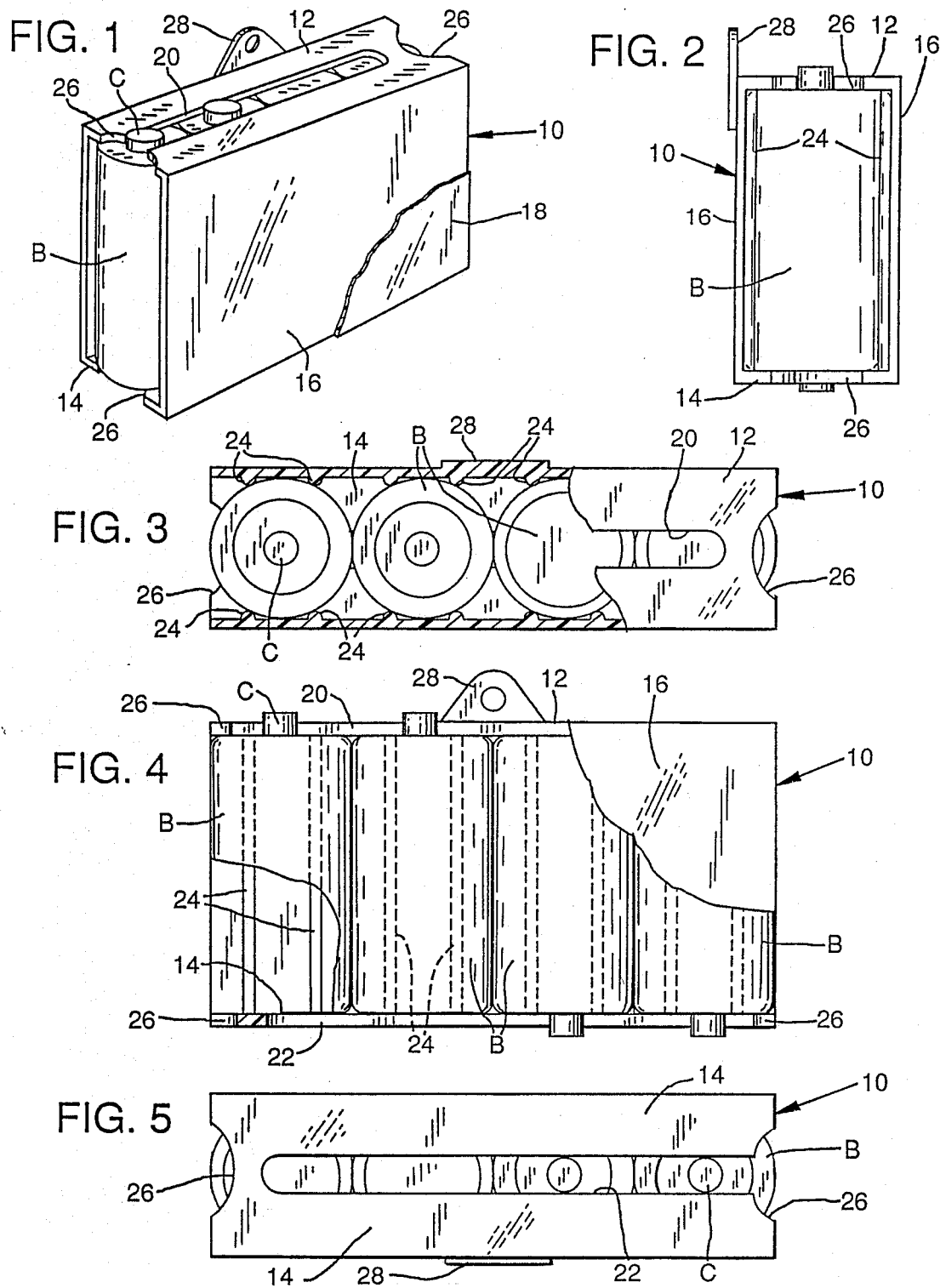

BATTERY PACKAGE

BACKGROUND OF THE INVENTION

This invention relates to new and useful improvements in battery packages and relates particularly to a package for marketing batteries and also for allowing the consumer to store them and distinguish between fresh and exhausted batteries.

Small dry cell batteries, commonly used in the home, are generally marketed in packages containing two or more of the batteries. In the usual case, not all the batteries are needed at once and they lie loose around the home. Also, battery and appliance manufacturers suggest that the user remove batteries from an appliance if the latter is infrequently used. It is difficult to distinguish these partially used batteries from new or exhausted batteries. Furthermore, used batteries generally are not immediately discarded and they also lie loose.

Frequently, fresh and used batteries get mixed up with each other. Most homes do not have a battery tester or charger and thus it is inconvenient to try all the loose batteries in their appliance. Even at that, it is not known if the battery is fresh or has merely temporarily recharged itself.

SUMMARY OF THE INVENTION

According to the present invention and forming a primary objective thereof, a battery package is provided that makes an efficient marketing container and also is arranged to receive and store exhausted batteries as the fresh batteries are used.

Another object of the invention is to provide a package of the type described having a structural arrangement that clearly shows, by the position of the battery therein, whether or not the battery is fresh or exhausted.

In carrying out these objectives, the package comprises a container having open ends through which batteries are slidable. Means are provided in the container for slidably receiving the batteries through one end in upright position and slidably receiving batteries in the other end in an upside down position whereby to distinguish between batteries that are fresh or used. Slot means are provided in the top and bottom walls of the container, the slots leading in opposite directions from respective ends of the top and bottom walls but terminating short of the other ends. These slots slidably receive the cathode of the batteries in projecting relation for viewing exteriorly of the holder to determine the condition of the battery. Friction means are provided within the container for holding the batteries firmly but slidably in place.

The invention will be better understood and additional objects and advantages will become apparent from the following description taken in connection with the accompanying drawings.

BRIEF DESCRIPTION OF THE DRAWINGS

FIG. 1 is a perspective view of a battery package embodying features of the present invention.

FIG. 2 is an end elevational view taken from the left side of FIG. 1.

FIG. 3 is a top plan view of the package with a portion thereof broken away.

FIG. 4 is a side elevational view also having a portion thereof broken away, and FIG. 5 is a bottom plan view.

DETAILED DESCRIPTION OF A PREFERRED EMBODIMENT

With particular reference to the drawings, the battery package of the invention comprises a container 10 having a top wall 12, a bottom wall 14 and side walls 16. The ends of the container are open. When supplied to the consumer, the open ends will be suitably sealed. Preferably the package is fully covered and sealed by a vacuum pack skin 18 or the like for supply to the consumer. The container 10 as well as the skin 18 are constructed of transparent plastic or the like whereby batteries B and lettering on the batteries can be viewed through the package.

Container 10 is suitably dimensioned, according to the size of the batteries it is to hold, for receiving batteries in an upright position through the open ends in a particular arrangement. That is, the top wall 12 has a slot 20 leading in from one end and the bottom wall 14 has a slot 22 leading in from the other end. Each of these slots extends substantially the full length of the container but terminates short of the end opposite from its open end. Slots 20 and 22 are of a width to slidably receive the cathode C of batteries in projecting relation. The inner side wall surfaces of the container have upright ribs 24 which frictionally engage the batteries and hold them firmly but slidably in place.

The top and bottom walls of the container have a notch 26 at each end which allows a finger grip to be obtained on a battery adjacent the open end of the container. The container is provided with a hanging tab 28 for display in the store or for storage at home.

The main purpose of the invention is to provide a battery package for a consumer that allows the consumer to distinguish between fresh and exhausted batteries. For example, fresh batteries can be supplied to the consumer with all the batteries in upright position and the cathodes projecting through slot 20. Since the slot 20 extends substantially the full length of the container, all the batteries can thusly be positioned. When it is desired that a battery be removed from the package, the skin 18 is first removed and the consumer then grasps the upper and lower ends of the battery at the dispensing end of slot 20 through the notches 26 and pulls it out. Or, if desired the battery at the opposite end can be pushed inwardly for advancing all the batteries forward and dispensing one.

When a battery is exhausted, it can be taken from the appliance and stored by inserting it upside down into the opposite end of the package from the dispensing end. As these exhausted batteries are inserted, their cathodes slide in and project from the slot 22. Since the slot 22 extends substantially the full length of the container, the latter can be fully loaded with exhausted batteries for discarding them.

If desired, the slots 20 and 22 can be used reversely from that described above. Also, if the user removes batteries from an appliance and they are still good, such batteries can be inserted in the fresh battery portion. In brief, small dry cell batteries can be conveniently marketed and individual batteries are conveniently made accessible to the user. In addition, batteries can be dispensed from the package or placed therein in an arrangement such that fresh batteries can be distinguished from exhausted ones. Such structure serves a dual purpose in that it serves as a convenient package for marketing and also the user can readily determine the condition of the batteries Also, old batteries are stored so that they will not lie loose around the home.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A package for batteries of the type having an end projecting cathode, said package comprising:
   a container having top, bottom and side walls,
   said container having open ends,
   a slot in each of said top and bottom walls,
   said slots leading in opposite directions from respective ends of said top and bottom walls and terminating short of the respective other ends,
   said container and its end openings being dimensioned to receive slidably a plurality of batteries with the cathode of some of said batteries projecting through the slot in the top wall and the cathode of others of said batteries projecting through the slot in said bottom wall whereby to distinguish between batteries contained in said holder.

2. The package of claim 1 including upright rib means interiorly of said container frictionally resisting but permitting slidable movement of said batteries therein.

3. The package of claim 1 wherein said slots slidably receive the cathode of the batteries in projecting relation for viewing exteriorly of said holder.

* * * * *